United States Patent

[11] 3,530,921

[72] Inventor Richard B. Ernest
Richboro, Pennsylvania
[21] Appl. No. 815,023
[22] Filed April 10, 1969
[45] Patented Sept. 29, 1970
[73] Assignee Penn Engineering & Manufacturing Corp.,
Danboro (Doylestown), Pennsylvania
a corporation of Delaware

[54] INSERTS
14 Claims, 14 Drawing Figs.
[52] U.S. Cl. .................................................... 151/41.73,
85/21
[51] Int. Cl. .................................................. F16b 15/06,
F16b 39/28
[50] Field of Search .......................................... 151/41.73,
41.7; 85/32K, 21, 47, 22, 14, 1Int., 83, 48; 287/20,
23, 119

[56] References Cited
UNITED STATES PATENTS
1,207,413  12/1916  Kennedy ..................... 85/21X
2,352,982  7/1944   Tomalis ....................... 85/48X
3,159,074  12/1964  Neuschotz .................... 85/47
FOREIGN PATENTS
487,967   6/1938   Great Britain ............. 85/32[K]UX Primary Examiner—Ramon S. Britts
Attorney—Denny and Denny ABSTRACT: A fastener or insert for use in plastic material is formed with an elongated and tapered body having a head and a forward end portion. The body includes a plurality of flanges spaced along its length between the head and the forward end portion, the flanges being derived from hexagon shapes and having what would be the corner portions of the hexagon shapes progressively reduced along the length of the fastener from the head to the forward end portion to provide a tapered shape at the corner portions of what would otherwise be hexagon shapes.

Patented Sept. 29, 1970 3,530,921
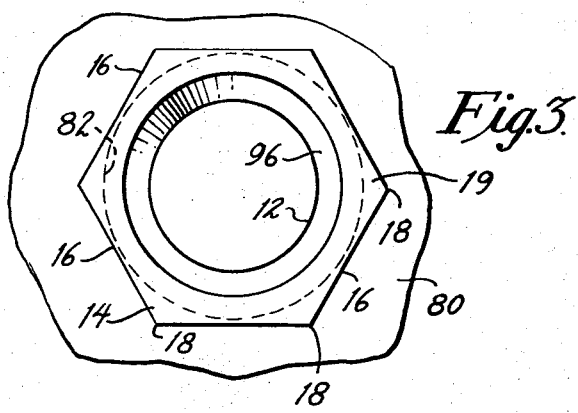
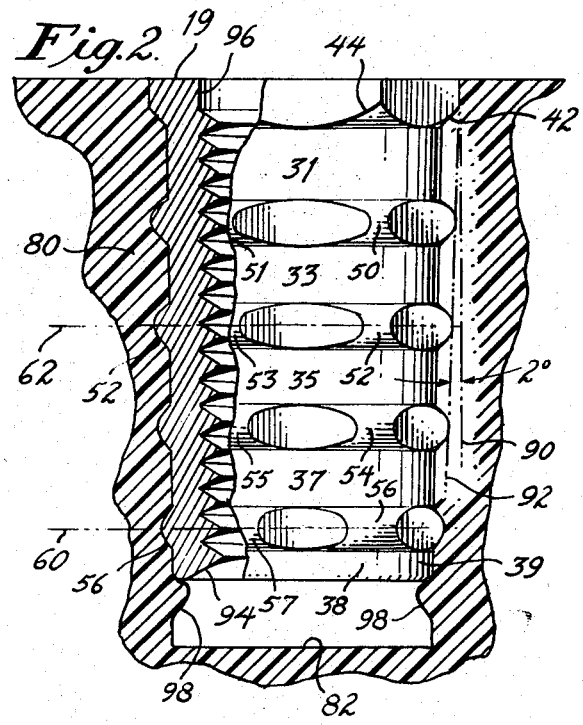
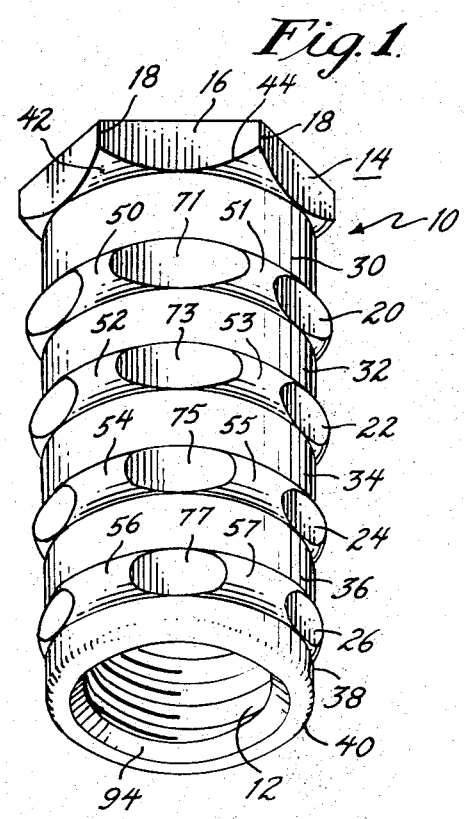
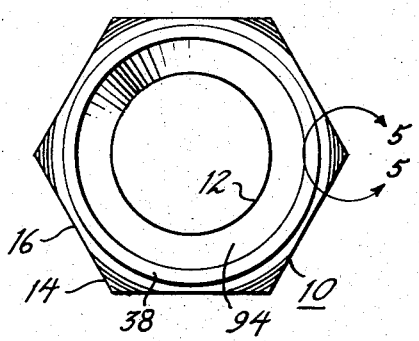
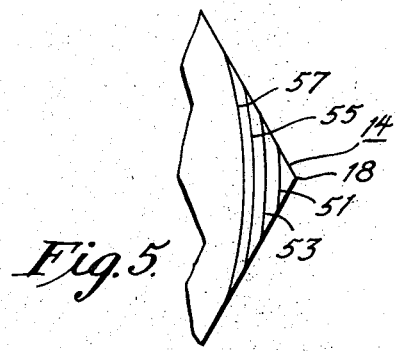
INVENTOR.
RICHARD B. ERNEST
BY
Denny and Denny
HIS ATTORNEYS INVENTOR.
RICHARD B. ERNEST
BY
Denny and Denny
HIS ATTORNEYS INVENTOR.
RICHARD B. ERNEST
BY Denny and Denny
HIS ATTORNEYS

INSERTS

BACKGROUND OF THE INVENTION

This invention relates to fasteners, also known as inserts, which are driven into thermoplastic materials such as by ultrasonic insertion or by being pressed into the thermoplastic material.

It is an object of this invention to provide a less expensive fastener or insert by constructing it from hexagon bar stock and to simultaneously construct it to facilitate its insertion into the plastic material.

BRIEF SUMMARY OF THE INVENTION

Hexagon bar stock is preferred, but as will be understood, the invention could be practiced with stock having more or less flat surfaces than provided by the six sides of a hexagon. The hexagon stock is machined to provide flanges and grooves on the outer surface and it is bored and threaded to suit, as required.

The fastener or insert for use in plastic material comprises an elongated and tapered body including a head and a forward end portion. The body includes a plurality of flanges spaced along the fastener with grooves between the flanges to receive the plastic material. The flanges are derived from the hexagon shapes of the bar stock and have what would be the corner portions of the hexagon shapes progressively reduced along the length of the insert from its head to its forward end portion to facilitate entry of the insert into the plastic material.

The foregoing and other objects of this invention, the principles of this invention and the best modes in which I have contemplated applying such principles will more fully appear from the following description and accompanying drawings in illustration thereof.

BRIEF DESCRIPTION OF THE VIEWS

In the drawings, FIG. 1 is an isometric side and bottom view of a fastener or insert constructed in accordance with the present invention;

FIG. 2 is a side elevation of the insert shown in FIG. 1, the insert being shown imbedded in plastic material, portions of the insert being cut away to show sections of the insert in cross section, the plastic material being also shown in cross section;

FIG. 3 is a top view of the insert and the plastic material shown in FIG. 2;

FIG. 4 is a bottom view of the insert;

FIG. 5 is an enlarged partial view of the corner portion of the insert generally enclosed by the lines 5–5 in FIG. 4;

DETAILED DESCRIPTION

Figure 7:
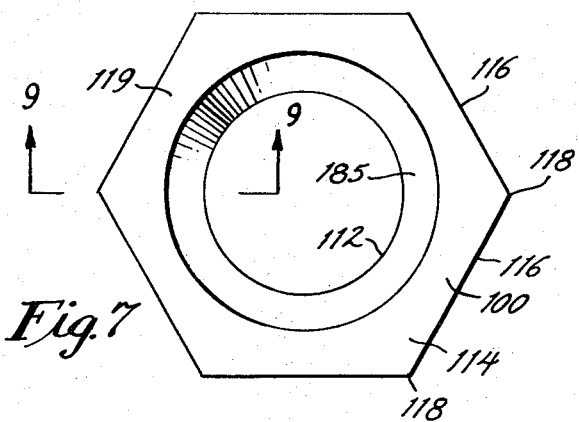
FIG. 7 is a top view of the insert shown in FIG. 6.
Figure 9:
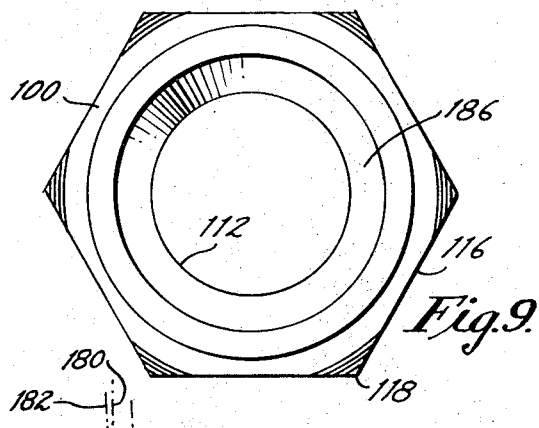
FIG. 9 is a bottom view of the insert shown in FIGS. 6, 7 and 8.

Referring to the drawings, FIG. 1 illustrates a fastener or insert 10 of elongated and tapered shape which may have an internal, threaded axial bore 12 which may extend through the fastener, as shown.

The fastener or insert 10 comprises a head or first flange 14 extending radially outwardly, as shown, of hexagon shape, as viewed in FIG. 3, and having the usual (six) flat surfaces 16 separated from each other by the corner portions 18. As shown, the head 14 may have a flat upper surface 19.

The fastener 10 further comprises additional flanges 20, 22, 24 and 26, the flange 20 being separated from the head 14 by a groove 30, the flanges 20 and 22 being separated from each other by a groove 32, the flanges 22 and 24 being separated from each other by a groove 34, and the flanges 24 and 26 being separated from each other by a groove 36. Below the flange 26, and opposite the head 14, the fastener is provided with a pilot or forward end portion 38 which preferably includes a forward radiused portion or nose 40 to further facilitate insertion of the fastener into a hole 82 in a plastic body 80, FIG. 2.

The grooves 30, 32, 34 and 36 and the part of pilot 38 above the radiused portion 40 are defined by cylindrical outer surfaces 31, 33, 35, 37 and 39, respectively of the same diameter. Preferably the diameter of the surfaces 31, 33, 35, 37 and 39 is somewhat less than the diameter of a circle inscribed within and tangent to the flat surfaces 16 of the hexagon-shaped head 14. The hole 82 in the plastic body 80 is then made of a diameter slightly larger than the diameter of the surfaces 31, 33, 35, 37 and 39 but preferably not larger than the diameter of a circle tangent to the flat surfaces 16 of the hexagon-shaped head 14.

The flanges 20, 22, 24 and 26, and the under side of the head 14, are curved or rounded when viewed along the length of the insert 10, as shown in FIGS. 1 and 2. However, as shown in FIG. 2 the rounded, under surface 42 of the head 14 has a curvature which is not great enough to completely remove the sharp corners 18 formed by the juncture of the flat surfaces 16 of the hexagon shape and the curved surface 42 extends down to the cylindrical surface 31, the intersection of the flat surfaces 16 with the curved surface 42 producing the arcuate shapes 44.

Insofar as the flanges 20, 22, 24 and 26 are concerned, the corner portions 50, 52, 54 and 56, respectively, of what would otherwise be the sharp, corner portions of the hexagon shapes are progressively cut away, on a taper, and formed with curved outer surfaces 51, 53, 55 and 57, respectively. The curved outer surfaces 51, 53, 55 and 57 are partial, circular surfaces extending around the outer surface of the flange, as best shown in FIGS. 4 and 5, and are concentric with the cylindrical surfaces 31, 33, 35, 37 and 39. In FIG. 5 a portion has been enlarged to show the concentric, circular surfaces 51, 53, 55 and 57 which increase in diameter from the end portion 40 to the head 14 along a taper angle of 2°, as shown in FIG. 2.

As best shown in FIG. 2, when viewed along the length of the insert 10, the surfaces 51, 53, 55 and 57 of the corner portions 50, 52, 54 and 56 are arcuate or curved symmetrically about the centerlines of the flanges, such as is better shown, for example, by reference to the centerlines 60 and 62 for the corner portions 56 and 52, respectively.

The jointure of the curved surfaces 51, 53, 55 and 57 with the flat surfaces 71, 73, 75 and 77 of the flanges forms or gives to the flat surfaces an elliptical-like shape, as shown.

Referring to FIG. 2 while a taper angle of 2° is shown between the vertical line 90 and a line 92 tangent with the surfaces 51, 53, 55 and 57, of the corner portions 50, 52, 54 and 56, drawn from the vertical edge of the corner 18, this angle of taper, however, may vary and may be in the range of 2° to 7° or possibly higher.

From the foregoing it is seen that a pilot 38 is provided having a diameter equal to or less than the diameter across the flats of the hexagon-shaped bar stock and flanges 20, 22, 24 and 26 have been provided between the head 14 and the pilot 38 having corners 50, 52, 54 and 56 which have been progressively tapered at a uniform angle to provide flanges 20, 22, 24 and 26 with corner portions 50, 52, 54 and 56, respectively, extending radially less than the radial extent of the corners 18, but projecting beyond the surface 39 of the pilot 38. Since the cylindrical surfaces 31, 33, 35 and 37 are of the same diameter, and the axial length of the surfaces 33, 35 and 37 are equal to each other and less than that of the surface 31, and the corners 50, 52, 54 and 56 of the flanges 20, 22, 24 and 26 are tapered as described, the volume of the grooves 30, 32, 34 and 36 is progressively less, but these volumes are sufficient to receive the plastic material displaced by the corners. The material which is displaced forward of the flange 26 flows inwardly toward the surface 39 and some also flows forward of the pilot 38, as shown at 98. While the pilot 38 is shown with an outer surface 39 of the same diameter as surfaces 30, 32, 34 and 36, it is seen that the pilot diameter 38 could be made smaller to further facilitate entry into the plastic material.

The insert 10 shown in FIGS. 1 to 5 is particularly well adapted for ultrasonic insertion into a body 80 of thermoplastic material. The insert 10 is placed with its pilot 38 within the hole 82 and ultrasonic energy is applied to the insert 10. The ultrasonic energy tends to locally soften or locally melt the material of the body 80 adjacent the insert sufficiently for the insert to be driven into the body 80 without the application of great force.

As the insert 10 is thus driven into the body 80, since the corners 50, 52, 54 and 56 of the flanges 20, 22, 24 and 26 are tapered and rounded, as viewed along the length of the insert 10 in FIG. 2, as well as being rounded transverse to the length of the insert, as viewed in FIGS. 4 and 5, the insert is more easily pressed into hole 82 and the locally softened and/or melted plastic body 80 flows back into parts of the grooves 30, 32, 34 and 36 between the corners 50, 52, 54 and 56.

Since the initial flange 26 which is driven into the plastic body 80 has corner portions 56 of the smallest diameter, it is seen that less plastic must be softened or melted to permit the insert to be driven past the flange 26. As the driving of the insert 10 continues, the ultrasonic energy heats more of the surrounding mass of the plastic body 80, so that by the time the larger diameter corner portions 54 engage the plastic body 80 more of the plastic body has been heated or melted permitting the flange 24 to more readily be driven into the plastic body. The described heating and driving of the insert taking place so that successive flanges are inserted more easily than if they all had corner portions of the same radial extent as the head 14 until finally the corners 18 of the head 14 are embedded in the plastic body.

The insert 10 may be driven into the body 80 until the head 14 is flush with the top of the body 80, as shown in FIG. 2, at which time the hexagon-shaped head 14 is embedded in the body 80 and closes the hole 82.

While the grooves 32, 34 and 36 may be of about the same axial length, when measured along the length of the insert, it is preferred to make the groove 30 somewhat longer so as to better accommodate the plastic material which may be displaced by the head 14.

Although the insert has been described with a pilot 38, it is seen that it may be omitted, if desired.

Also, while the head 14 has been shown retaining only part of the sharp corners 18 formed by the flat sides of the hexagon, it is seen that the corners 18 could be kept full, or further cut away, without departing from the scope of this invention.

As shown, the threaded bore 12 in the insert 10 may have a beveled surface 94 at its lower end and may have a countersunk hole 96 at its upper end, as desired.

While the insert 10 has been shown with a threaded internal bore 12 it is seen that the threaded bore may be omitted, if desired. For example, a projecting threaded stud, not shown, could be made integral with the fastener and made to extend above the plastic body, but this is not illustrated.

The heretofore described insert 10 may be made on a lathe or screw machine (not shown) wherein a suitable length of hexagon bar stock (not shown) is suitably rotated and machined. The machining sequence may vary, but might be as is briefly described hereinafter.

A taper cutting tool will first engage the corners of the hexagon stock below the head 14 and taper the corners of the stock along the length of the insert to the approximate angle desired. A forming tool will then engage the surface of the bar stock and cut into it the various grooves 30, 32, 34 and 36 and simultaneously form the flanges 20, 22, 24 and 26, while also forming the pilot 38, the under surface 42, and partially cutting the bar stock behind what will be the head 14. The bore is then drilled throughout the insert and beveled adjacent the pilot 38, the bore being then threaded or the thread being formed on a separate machine in a subsequent operation, as desired. The insert is then cut off from the bar stock and picked up by a rotating, adjustable collet. Subsequently, another tool engages the head of the insert to cut into the insert the counterbore 96.

FIGS. 6 through 14 illustrate various modifications of the invention better adapted to be pressed into a plastic body, such as of soft or thermoplastic material, without the use of ultrasonic energy. The modifications of FIGS. 6 through 14 are also machined from hexagon bar stock.

Referring to FIGS. 6, 7, 8 and 9, the modified fastener or insert 100 also has an elongated and tapered shape and an internal, threaded axial bore 112 which may extend through the fastener, as shown.

The fastener 100 comprises a head or first flange 114 extending radially outwardly, as shown, of full hexagon shape, as viewed in FIG. 7, and having the usual flat surfaces 116 separated from each other by the sharp corner portions 118. As shown, the head 114 may have a flat upper surface 119.

The fastener 100 further comprises additional flanges 120, 122, 124 and 126, the flange 120 being separated from the head 114 by a groove 130, the flanges 120 and 122 being separated from each other by a groove 132, the flanges 122 and 124 being separated from each other by a groove 134, and the flanges 124 and 126 being separated from each other by a groove 136. Below the flange 126, and opposite the head 114, the fastener is provided with a pilot or forward end portion 138 which preferably has a forward radiused portion or nose 140 to facilitate insertion of the fastener into the hole in a plastic body, the latter not being shown in FIGS. 6 through 9.

The grooves 130, 132, 134 and 136 and the pilot 138 are defined, in part, by concentric conical surfaces 131, 133, 135, 137 and 139 which taper progressively along the length of the insert, the wall 139 being of the smallest diameter and the wall 131 being of largest diameter. The conical surfaces 133, 135 and 137 are joined to horizontal surfaces 146, 147 and 148 by radiused portions, as shown.

The groove 130 is further defined by the horizontal under side 140 of the head and the upper horizontal surface 141 of flange 120.

The flanges 120, 122, 124 and 126 are further defined by tapered surfaces 142, 143, 144 and 150 the horizontal surfaces 141, 146, 147 and 148, respectively.

The tapered surface 150 of the flange 126 joins the pilot 138, as shown.

The corner portions 160, 161, 162 and 163 include part conical, concentric, aligned surfaces 170, 171, 172 and 173 of the same height (or axial dimension when measured along the length of the insert), but which vary in size circumferentially, as shown.

Preferably the height, dimension D of the roots of the grooves 132, 134 and 136 is equal to the height of the corner surfaces 170, 171, 172 and 173, dimension C, as shown. The groove 130 may be made substantially larger, as shown, to accommodate the larger amount of plastic material which may be displaced by the head 114.

Figure 8:
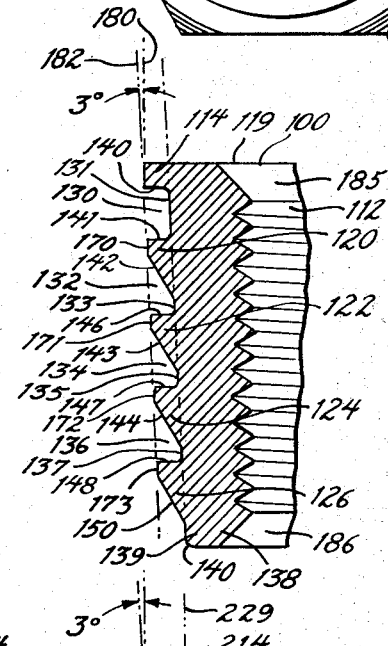
FIG. 8 is a partial, cross sectional view of the insert taken along the line 9–9 in FIG. 7.

The surfaces 170, 171, 172 and 173 are preferably formed by progressively reducing or cutting away on a taper the corners of the hexagon-shaped bar from which the insert is preferably formed, a 3° taper being shown between the vertical line 180 and the taper line 182, FIG. 8, although this angle may vary.

Further, the conical surfaces 131, 133, 135, 137 and 139 are at an angle which is parallel to that of the corner surfaces 170, 171, 172 and 173.

Also, the tapered surfaces 142, 143, 144 and 150 are formed at tapered angles parallel to each other, i.e., the taper angle for the surfaces is the same for all the flanges.

The insert 100 described in connection with FIGS. 6 to 9 is particularly well adapted to be pressed into a sufficiently soft plastic material, such as a thermoplastic material, without the use of ultrasonic energy.

The plastic body (not shown) to which the insert 100 is to be secured is provided with a hole (not shown) of a diameter slightly larger than that of the pilot 138. The pilot 138 is placed within the hole and a sufficient force is applied to the insert 100 to drive it into the plastic body.

As the flange 126 engages the plastic body it tends to spread the plastic material apart, i.e., radially outwardly, although a small part of the material may tend to flow downwardly, particularly adjacent and under the corner portions 160, 161, 162 and 163. As the insert continues its forward motion, the plastic material will spring behind the flange 126, into the groove 136. As the insert passes through the hole in the plastic body, the plastic material will not spring back entirely to its original position as some permanent deformation takes place. Because of this permanent deformation, the next entering flange, flange 124, will be presented with less material to spread apart or displace than flange 126, but since flange 124 extends radially outwardly more than flange 126 it will contact and displace sufficient plastic material to compensate for the permanent deformation that has taken place. That is, the succeeding flanges have been tapered so that each entering flange displaces sufficient material for the required retention of the insert.

A similar action takes place as each succeeding flange enters the plastic body until the head 114, which has corners 118 which extend radially outwardly the most, enters the plastic body.

The conical corner surfaces 170, 171, 172, and 173 help push the plastic material aside and the corner portions 160, 161, 162 and 163 provide resistance to rotation of the insert together with the corner portions 118 of the head 114.

The flat, horizontal surfaces 141, 146, 147 and 148 provide surfaces which bear against the plastic material which springs into the grooves 130, 132, 134 and 136 to resist any forces tending to pull out the insert.

As shown, it is preferred to provide a radius at the corners of the groove 130.

Figure 6:
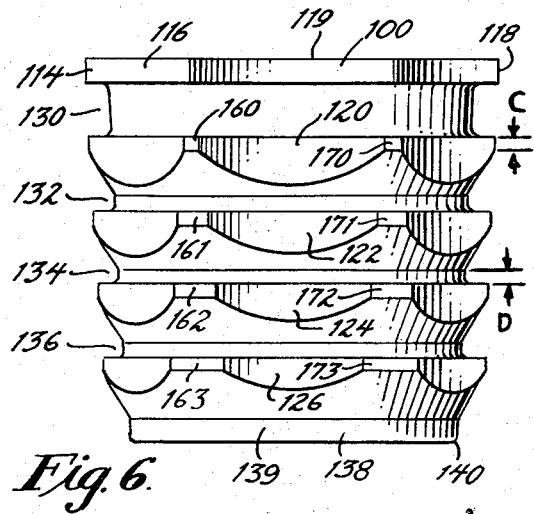
FIG. 6 is a side elevation of another embodiment of this invention.

From the foregoing it is seen that an insert 100 has been provided in which all of the grooves 130, 132, 134 and 136 have the same depth, as shown in FIGS. 6 and 8, and substantially similar volumes, but each root thereof extends at a different radius from the axial centerline of the insert.

Figure 10:
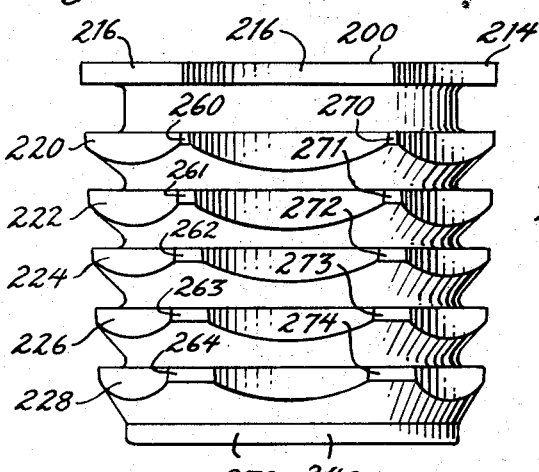
FIG. 10 is a side elevation view of a further embodiment of this invention.
Figure 11:
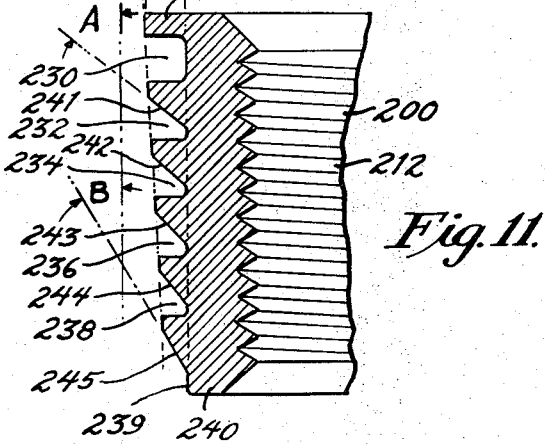
FIG. 11 is a partial cross sectional view of the insert shown in FIG. 10.

FIGS. 10 and 11 illustrate another embodiment of an insert 200 similar to the insert 100 and intended to be pressed into a plastic material.

The insert 200 has a hexagon-shaped head 214 and flanges 220, 222, 224, 226 and 228, but the groove 230 separating the head 214 from the flange 220, and the grooves 232, 234, 236 and 238 separating the flanges from each other have roots which are equally spaced from the axial centerline of the insert, as shown by the line 229, and aligned with the cylindrical surface 239 of the pilot 240.

The corner portions 260, 261, 262, 263 and 264 of the insert are tapered at a 3° angle, as shown, the same as the corner portions of the embodiment shown in FIGS. 6 to 9.

However, the tapered, undersides 241, 242, 243, 244 and 245 of the flanges are tapered at variable angles, as shown. The angle A for the flange 220 being the largest and each tapered surface for the lower flanges decreasing so that the angle B for the flange 228 is the smallest.

The arrangement shown in FIGS. 10 and 11 thus also provides part conical, corner surfaces 270, 271, 273 and 274 of a constant desired height, as shown, while the circumferential width thereof increases, the narrowest surface being the surface which projects radially outwardly the most, surface 270 and the widest surface being the one that projects radially outwardly the least, surface 274, all of which is the same as in the embodiment of FIGS. 6 to 9.

Unlike the arrangement shown in FIG. 8, in the embodiment of FIGS. 10 and 11, the roots of the grooves 232, 234, 236 and 238 are fully radiused, instead of being formed with part conical surfaces as in FIG. 8.

It is thus seen that the volumes of the grooves 232, 234, 236 and 238 vary, becoming progressively larger from the volume of the groove 238 up to the volume of the groove 230.

Figure 12:
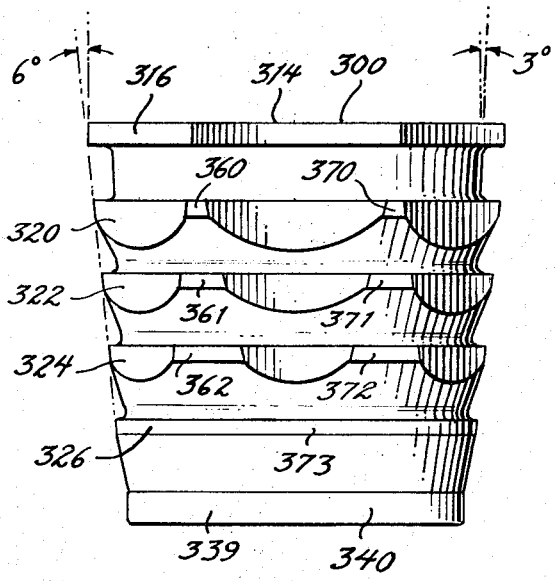
FIG. 12 is a side elevation of another form of the invention.
Figure 13:
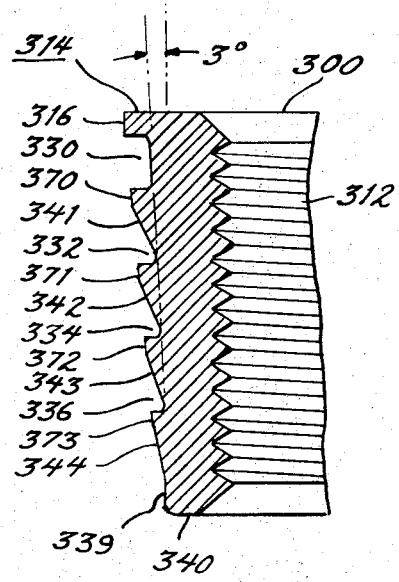
FIG. 13 is a partial cross sectional view of the insert shown in FIG. 12.
Figure 14:
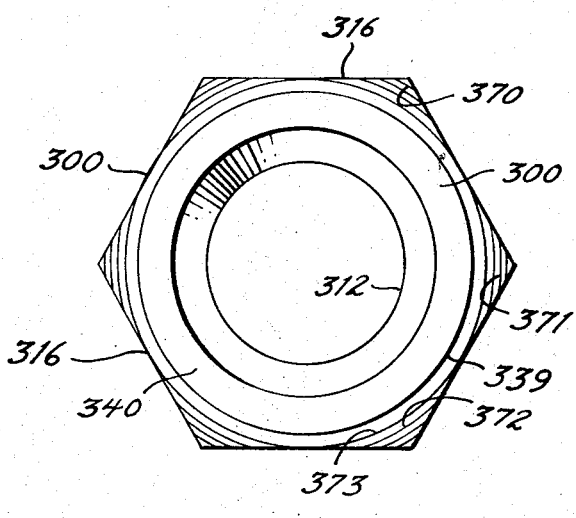
FIG. 14 is a bottom view of the insert shown in FIGS. 12 and 13.

FIGS. 12, 13, and 14 illustrate a further embodiment of an insert 300 similar to the inserts 100 and 200 previously described, the insert 300 being also intended to be driven into a plastic material without the use of ultrasonic energy.

The insert 300 also has a hexagon head 314 and flanges 320, 322, 324 and 326 generally similar to the flanges 220, 222, 224, and 226 shown in FIGS. 10 and 11. However, the flange 326 includes a fully cylindrical surface 373 due to the fact that the insert 300 is tapered at a much steeper angle, that is, 6°, as shown in FIG. 12 instead of the 3° angle shown in FIG. 11 for the insert 200. Of course, the 6° angle shown may vary.

Also, the flange 320 is separated from the hexagon head 314 by a groove 330 and the flanges 320, 322 and 324 are separated from each other by grooves 332, 334, and 336.

The roots of the grooves 330, 332, 334 and 336 together with the conical surface 330 are tapered along a 3° angle, as shown in FIGS. 12 and 13, but this angle may vary also.

The flanges 320, 322, 324 and 326 further include tapered under surfaces 341, 342, 343, and 344 as shown, the angle at which the surfaces 341, 342, 343 and 344 are tapered being variable and in this respect these flanges are also similar to the flanges of the insert 200.

The insert 300 is also provided with a pilot 340 being a conical surface 339, the pilot 340 being radiused at the front, as shown.

From the foregoing it is seen that the insert 300 is provided with a pilot 340 and a first, circular flange 326. The flange 324 immediately above the flange 326 has peripherally spaced corner portions 362 as the flanges of the previous embodiments. The flange 322 (above the flange 324) has similar corner portions 361 as does also the flange 320 next above the flange 322 have corner portions 360. The corner portions 360, 361 and 362 are formed by tapering hexagon bar stock at the 6° angle, as mentioned in connection with the previous embodiments. The corner portions 360, 361 and 362 have part conical surfaces 370, 371 and 372 whose height is constant, but whose width increases along the length of the insert from top to bottom, similarly to the two embodiments previously described.

In this way, when the insert 300 is first pushed into the hole in the plastic material (not shown) within which it is to be inserted, the angular, conical surface 373 tends to radially displace the plastic material. As the driving of the insert 300 into the plastic material continues, the displaced plastic material will flow around the flange 326 and behind it into the groove 336. However, the plastic material will not return completely to its original diameter, so that when the next larger flange 324 engages the plastic material it will displace sufficient plastic material in a manner similar to that displaced by the first flange. Thus, as successive flanges, and their corner portions, of greater diameter engage the plastic material, the plastic material is successively engaged by a radially greater portion of the insert, until eventually the hexagon shaped head becomes embedded in the plastic material, and the required axial and rotational retention of the insert in the plastic results.

While the various embodiments have been described in terms of being derived from hexagon shaped stock, it is seen that any symmetrical polygonal shaped element could be used.

To provide a tight fitting insert I prefer that the volume of the various grooves be equal to or less than the volume of the plastic material displaced by the flanges.

In the first embodiment, the flanges were described as having corner portions which were rounded and curved, the embodiment of FIGS. 1 to 5, but it is seen that the upper parts of the flanges, as viewed in FIG. 2, could be flat as shown for the flanges in the subsequent embodiments.

Likewise, the flanges of the second, third and fourth embodiments are shown with tapered undersurfaces to facilitate entry into the plastic material, but they may be rounded or curved.

The groove next to the head in all of the embodiments is made larger than the remaining grooves as this groove is required to accept the plastic material which the head displaces and the plastic material which springs back behind the first flange next to the head.

Thus, all of the previous embodiments provide a novel insert for use in plastic material in which the embedded corners of the full hexagon or the embedded tapered corners thereof tend to resist the rotational forces that may be imposed on the insert. Also, the displaced material within the various grooves, *i.e.*, behind the flanges relative to the direction the insert is driven into the plastic, resists any axial forces tending to displace the insert, such as push out or pull out forces.

I claim:

1. A fastener or insert for use in plastic material comprising:
   an elongated and tapered body having first and second end portions;
   said body including a plurality of annular flanges spaced from each other along its length between said end portions;
   said body including grooves between said flanges to receive said plastic material; and
   said flanges being derived from a solid of polygonal shape in cross section and having what would be the corners of the polygonal shapes progressively reduced along the entire length of said fastener from said first end portion to said second end portion to define peripheral antirotational corner portions which are of greatest peripheral extent adjacent the end of said insert which is last driven into said plastic material.

2. The structure recited in claim 1 wherein said grooves all include cylindrical surfaces of the same diameter.

3. The structure recited in claim 1 wherein said polygonal shape is hexagonal and said first end portion is a head of hexagon shape.

4. The structure recited in claim 1 wherein said corner portions when viewed in axial cross-section are symmetrically rounded and when viewed in transverse cross-section are partly circular.

5. The structure recited in claim 1 wherein said flanges have flat elliptical-like surfaces between said corner portions, and said first end portion is a head of hexagon shape.

6. The structure recited in claim 2 wherein said first end portion is a head of hexagon shape and has an arcuate under surface.

7. The structure recited in claim 1 wherein said fastener has a threaded bore, and said first end portion is a head of hexagon shape.

8. The structure recited in claim 1 wherein said first end portion is a head of hexagon shape and said second end portion is a pilot.

9. A fastener or insert for use in plastic material comprising:
   an elongated and tapered body;
   said body including a head and a pilot;
   said body including a plurality of flanges spaced along its length between said head and said pilot;
   said body including grooves between said flanges to receive said plastic material;
   said flanges being derived from hexagon shapes and having what would be the corner portions of said hexagon shapes progressively reduced along the length of said fastener from said head to said pilot;
   said grooves all including cylindrical outer surfaces of the same diameter;
   said head being of hexagon shape;
   said flanges having symmetrically rounded and part circular corner portions;
   said flanges having flat elliptical-like surfaces between said corner portions;
   said head having an arcuate under surface; and
   said fastener having a threaded bore.

10. The structure recited in claim 1 wherein said corner portions include conical surfaces.

11. The structure recited in claim 10 wherein said grooves are defined by roots inclined at the same taper angle as said conical surfaces.

12. The structure recited in claim 1 wherein said grooves have concentric roots aligned along the same cylindrical plane.

13. The structure recited in claim 10 wherein said roots are inclined but to a lesser taper angle than said conical surface.

14. The structure recited in claim 10 wherein said conical surfaces have the same height but become wider from said first end portion toward said second portion, said flanges having entry facilitating surfaces on the side facing said second end portion to facilitate entry of the insert into the plastic material, said flanges having push out resisting surfaces on the side facing said first end portion to resist push out forces on said insert, said groove adjacent said first end portion being larger than any of the other grooves to receive plastic material displaced by the last flange to be inserted into said plastic material as well as the plastic material which springs back behind the next to last flange to be inserted in the plastic material, said polygonal shape is a hexagon, said first end portion is a hexagon-shaped head, and said second end portion is a pilot.